G. E. WITT.
REDUCING VALVE.
APPLICATION FILED OCT. 6, 1909.
960,758.
Patented June 7, 1910.
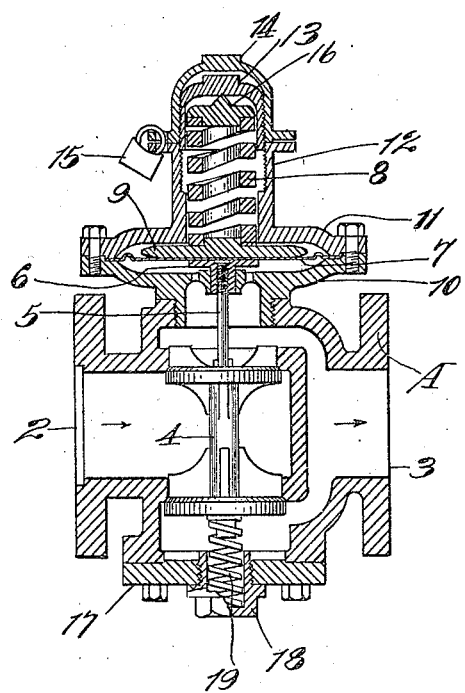

UNITED STATES PATENT OFFICE.

GEORGE E. WITT, OF SAN FRANCISCO, CALIFORNIA.

REDUCING-VALVE.

960,758.     Specification of Letters Patent.     Patented June 7, 1910.

Application filed October 6, 1909. Serial No. 521,411.

*To all whom it may concern:*

Be it known that I, GEORGE E. WITT, citizen of the United States, residing in the city and county of San Francisco and State of California, have invented new and useful Improvements in Reducing-Valves, of which the following is a specification.

My invention relates to valves. Its object is to provide a simple, cheap, practical and reliable valve operated by diaphragm and springs and so constructed that the valve itself is not connected with the diaphragm; and with which valve the trouble caused in a piston actuated reducing valve is overcome, as it is impossible for this valve to stick. It is also my object to provide a valve of this sort in which there is no chattering or blowing through, and which can be ground or reseated at any time without expense for new parts.

The invention consists of the parts and the construction and combination of parts as hereinafter more fully described and claimed, having reference to the accompanying drawing, in which the figure is a vertical, central section of the valve.

A is a valve casing having an inlet at 2 and an outlet at 3 and provided with a double-seating balance valve 4. The valve stem 5 is secured to a plate 6 which bears loosely against the under side of a suitable flexible diaphragm 7. The diaphragm 7 is adapted to be operated on by the fluid pressure passing through the valve, and the variations in this pressure move the diaphragm up or down to correspondingly actuate the valve 4. Counterposed to the action of the fluid pressure in the valve is a tension spring 8 acting on a plate 9 on the opposite side of the diaphragm from plate 6. The diaphragm is removably clamped in position between a dish-shaped flange 10 on the valve casing, and a cover-plate 11 bolted thereto, this cover-plate having an outwardly projecting cylindrical part 12 into which is screw-threaded a cup-shaped nut 13. This nut 13 is externally threaded to receive a locking cap 14 which may be secured to the valve by suitable means, as the padlock 15, to prevent tampering with the spring 8 after the latter has once been set to the proper pressure. The spring 8 has one end bearing against the plate 9 and the other against a block 16, which latter bears against the hollow nut 13.

In operation, and before the cap 14 is screwed on, the spring 8 is set to proper tension by suitably manipulating the nut 13, the spring acting on one side of the diaphragm and against the fluid pressure in the valve. After once being set, the cap is placed in position, and the valve becomes practically a locked pressure reducing valve.

The valve can be removed at any time for regrinding or renewal by simply removing the cap plate 17 into which is screwed the adjustable plug 18 forming a seat for the spring 19.

The double-ended valve 4 is counterbalanced and is normally open and remains open so long as the steam pressure on the underside of the diaphragm 7 does not exceed the pressure exerted from above by the spring 8. When the fluid pressure on the underside of the diaphragm exceeds a predetermined desired pressure, the diaphragm 7 lifts, thereby compressing spring 8, and by removing the pressure on valve 4 the latter is closed by spring 19. The valve cannot close until the diaphragm lifts sufficiently to allow spring 19 to act.

Having thus described my invention, what I claim and desire to secure by Letters Patent is—

1. In a reducing valve the combination of a valve casing, a valve therein having a projecting stem, a diaphragm exposed on one side to the fluid pressure in the casing and supported loosely upon the upper end of the valve stem, and disconnected from said stem, a regulating spring acting in opposition to the fluid pressure and located on the opposite side of the diaphragm, said casing having a portion inclosing the spring and internally threaded, an internal nut threaded on its outside to engage the threads of said spring-inclosing portion and adapted to regulate the tension of said spring, and a cap inclosing the nut and having internal threads screwing into engagement with the threads of said nuts whereby the cap incloses and locks the nut in place, and means for locking the cap to a fixed portion of the valve casing.

2. In a reducing valve, the combination of a valve casing and a valve therein, a diaphragm exposed on one side to the fluid pressure in the valve, the valve having a stem bearing loosely against and disconnected from the diaphragm, a regulating spring and presser plate acting on the opposite side of the diaphragm from the valve, and means for adjusting the tension of said spring, said means including a hollow nut against the inside of which one end of said spring seats, said nut externally threaded and screwing into a part carried by the valve casing, and a locking cap screwing on to the nut, with means for locking said cap to the casing.

In testimony whereof I have hereunto set my hand in the presence of two subscribing witnesses.

GEORGE E. WITT.

Witnesses:
FRANK L. OWEN,
EMERSON W. READ.